United States Patent [19]

Mori et al.

[11] Patent Number: 4,718,328
[45] Date of Patent: Jan. 12, 1988

[54] BRAKE BOOSTER OF TANDEM TYPE

[75] Inventors: Kohei Mori, Ogawa; Haruo Suzuki, Higashimatsuyama, both of Japan

[73] Assignee: Jidosha Kiki Co., Ltd., Tokyo, Japan

[21] Appl. No.: 873,240

[22] Filed: Jun. 11, 1986

[30] Foreign Application Priority Data

Jun. 17, 1985 [JP] Japan .............................. 60-91056[U]

[51] Int. Cl.⁴ ................................................ F15B 9/10
[52] U.S. Cl. .................................... 91/376 R; 91/534; 92/48
[58] Field of Search ............. 92/48; 91/376 R, 369 A, 91/534; 403/259; 60/547.1

[56] References Cited

U.S. PATENT DOCUMENTS

| | | | |
|---|---|---|---|
| 4,400,943 | 8/1983 | Belart | 60/547.1 |
| 4,512,237 | 4/1985 | Endoh | 91/369 A |
| 4,516,474 | 5/1985 | Ochiai | 92/48 |
| 4,535,680 | 8/1985 | Takayama | 91/369 A |
| 4,542,680 | 9/1985 | Takeuchi | 91/369 A |
| 4,586,427 | 5/1986 | Thiel | 91/369 A |

*Primary Examiner*—Abraham Hershkovitz
*Attorney, Agent, or Firm*—Flynn, Thiel, Boutell & Tanis

[57] ABSTRACT

A brake booster of tandem type comprises a pair of power pistons, a valve body internally housing a valve mechanism and a center body formed with a passage which communicates with a passage formed in the vlave body, all of which are integrally connected together, by holding them between a hub which is disposed through these members in alignment with their axes and a nut which is threadably engaged with the hub. An ear is formed on one of the outer peripheral surface of the hub and in an opening formed in the front power piston through which the hub extends while a recess is formed in the other for receiving the ear, thus allowing the hub and the front power piston to be positioned relative to each other by the engagement between the ear and the recess.

10 Claims, 15 Drawing Figures

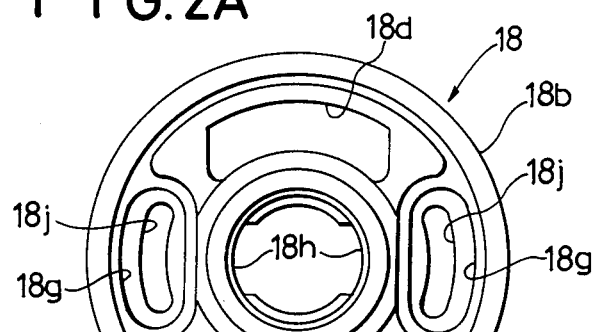
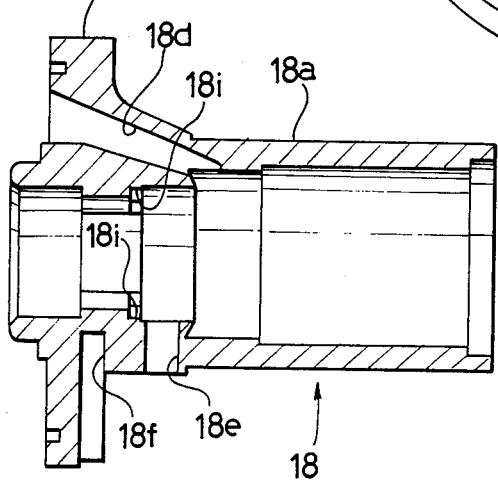
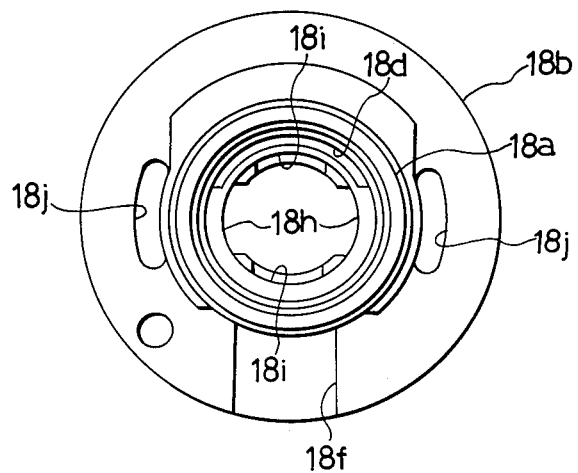

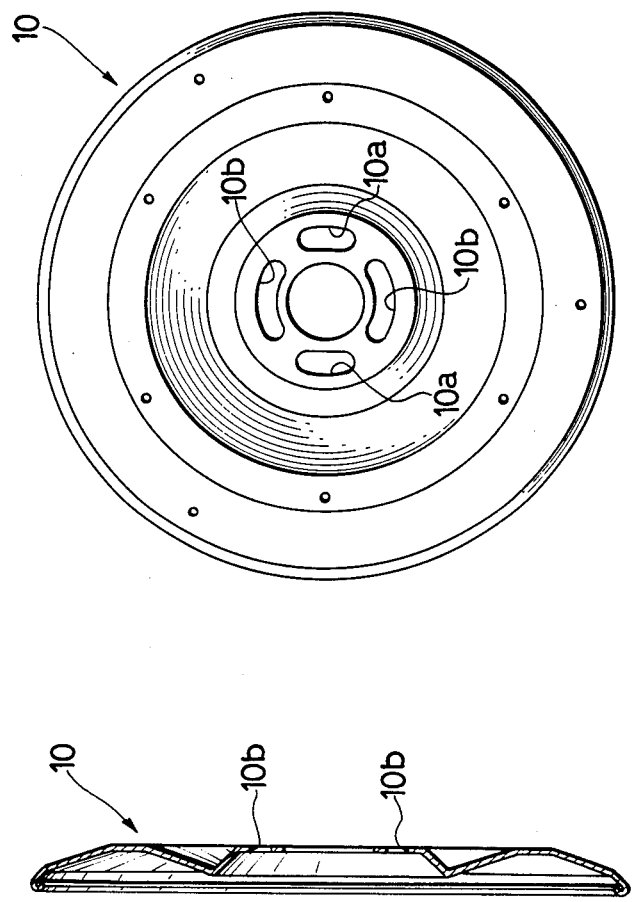

4,718,328

BRAKE BOOSTER OF TANDEM TYPE

BACKGROUND OF THE INVENTION

The invention relates to a brake booster of tandem type, and in particular, to the positioning of various members which secures passages between individual pressure chambers.

A brake booster of tandem type known in the prior art has a construction including a pair of power pistons which are disposed within and serve as partitions in an enclosed shell, a valve body internally housing a valve mechanism, and a center body having a path formed therein which communicates with a passage within the valve body, all of which are integrally connected together by being held between a hub which extends through axial portions of these members and a nut which is threadably engaged with the humb. In conventional construction of tandem brake booster, the peripheral surface of the hub and an opening formed in the front power piston through which the hub extends are both formed in polygonal shape such as hexagonal shape for engagement therebetween.

When the outer surface of the hub and the opening in the front power piston are hexagonal in configuration, it is possible to achieve an engagement between the piston and the hub at an angular position which is angularly displaced 60° from its design position. Accordingly, before these members are connected together, it is necessary that their positions be confirmed so that a path formed in the piston communicates with a path formed in the center body.

SUMMARY OF THE INVENTION

Therefore, it is an object of the invention to provide a brake booster of tandem type which simplifies the assembly without the likelihood of a wrong assembly, thus assuring the establishment of fluid passage.

The above object is accomplished in accordance with the invention by providing a projection either on the peripheral surface of the hub or in the opening of the piston through which the hub extends and providing a recess matable with the projection in the other of these members.

BRIEF DESCRIPTION OF THE DRAWINGS

FIG. 2 shows a valve body, specifically, FIG. 2(A) being a front view, FIG. 2(B) a longitudinal section, and FIG. 2(C) a rear view of the valve body;

FIG. 7 shows a rear power piston, specifically, FIG. 7(A) being a longitudinal section and FIG. 7(B) being a rear view of the rear power piston.

DESCRIPTION OF EMBODIMENT

Figure 1:
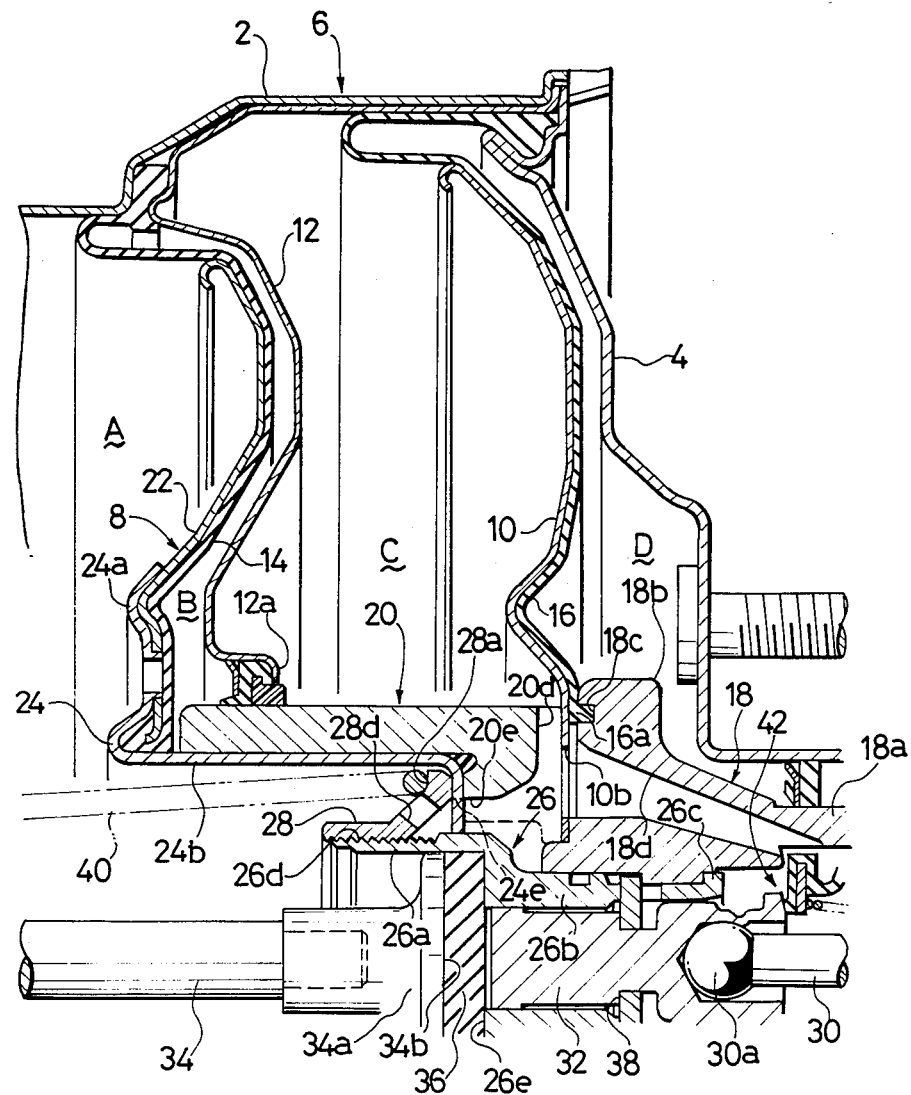
FIG. 1 is a longitudinal section of essential part of a brake booster according to one embodiment of the invention.

Referring to the drawings, an embodiment of the invention will now be described. FIG. 1 is a longitudinal section of essential part of a brake booster of tandem type according to one embodiment of the invention. Specifically, a combination of a front shell 2 and a rear shell 4 defines an enclosed shell 6, in which a front power piston 8 and a rear power piston 10 are disposed in tandem configuration. A center plate 12 divides the interior of the enclosed shell 6 into a front chamber in which the front power piston 8 is disposed and a rear chamber in which the rear power piston 10 is disposed. In addition, a front diaphragm 14 secured to the back surface of the front power piston 8 divides the front chamber into a pair of pressure chambers A and B while a rear diaphragm 16 secured to the back surface of the rear power piston 10 divides the rear chamber into pressure chambers C and D.

A valve body 18 is disposed in alignment with the axis of the enclosed shell 6, and includes a cylindrical portion 18a and a portion 18b of an increased diameter which integrally extends from the cylindrical portion. An annular groove 18c is formed in the front end face of the valve body 18, and the edge of the rear diaphragm 16 at its inner periphery is fitted into the groove 18c. A cylindrical center body 20 is connected to the front face of the valve body 18, and the inner peripheral edges of the rear power piston 10 and the rear diaphragm 16 are held between the center body 20 and the valve body 18.

The front power piston 8 comprises an annular piston plate 22, and a cylindrical retainer 24 having a flange 24a which is secured to the inner periphery of the piston plate 22. The retainer 24 has a cylindrical portion 24b which is fitted inside the center body 20. The outer peripheral surface of the center body 20 is fitted inside the inner periphery 12a of the center plate 12 so as to be slidable relative thereto while maintaining a hermetic seal therebetween.

A hub 26 having a portion 26a of an increased diameter and another portion 26b of a reduced diameter extends through the valve body 18, the center body 20 and the retainer 24 of the front power piston 8 along the axes thereof. At its free end, the portion 26b of the hub 26 is formed with an arcuate projection 26c which may be engaged with a recess formed in the valve body 18 to prevent its disengagement once it has been inserted into the valve body 18, as will be further described later. In addition, the end of the portion 26a of the hub is formed with male threads 26d which are threadably engaged witha nut 28, thus integrally connecting the valve body 18, the center body 20 and both the front and the rear power piston 8, 10 together.

The portion 26b of the hub 26 receives a valve plunger 32 which is staked to a spherical ball 30a at the free end of an input shaft 30 which is mechanically coupled to a brake pedal, not shown. On the other hand, the portion 26a of the hub 26 has the free end 34a of an output shaft 34 fitted therein, and a reaction disc 36 is interposed between the end face 34b of the output shaft 34 and a step 26h which is defined between the portions of different diameters of the hub 26. Accordingly, when the booster is operated, a brake reaction is transmitted to the brake pedal through the output shaft 34, the reaction disc 36, the valve plunger 32 and the input shaft 30.

A key 38 extends through openings formed in the valve body 18 and the hub 26 to lock the valve plunger 32 against disengagement. A return spring 40 is disposed between the internal surface of the front shell 2 and the spring abutment 28a formed on the nut 28 for normally urging the front and the rear power piston 8, 10 to their inoperative positions shown.

FIGS. 2 to 7 show the detail of the valve body 18, the center body 20, the retainer 24, the hub 26, the nut 28 and the rear power piston 10, respectively, and a construction for connecting these members 18, 20, 24, 26, 28 and 10 together and passages which provide a communication between the pressure chambers A, B, C and D will now be described.

Referring to FIGS. 2(A), (B) and (C), the valve body 18 comprises a passage 18d which extends from the front end face of the portion 18b having an increased diameter into the inside of the cylindrical portion 18a, and a radially extending passage 18e formed in the cylindrical portion 18a at an angular position which is offset 180° from the location of the passage 18d. An opening 18f is disposed to allow the key 38 to extend therethrough. A pair of elliptical openings 18g and a pair of elliptical passages 18j are formed in the portion 18b of an increased diameter at locations which are offset 90° from the locations of the both passages 18d and 18e. Part of the internal surface of the portion 18b of an increased diameter is formed with notches 18h which permit the pair of arcuate projections 26c formed on the portion 26b of the hub 26 to extend therethrough while the remainder of the internal surface is formed with recesses 18i which receive the arcuate projections 26c.

Figure 3A:
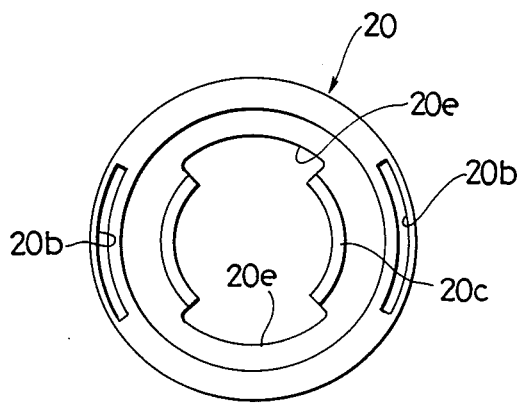
FIG. 3 shows a center body, specifically, FIG. 3(A) being a front view, FIG. 3(B) a cross section taken along the line B—B shown in FIG. 3(C) and FIG. 3(C) a rear view of the center body.
Figure 3B:
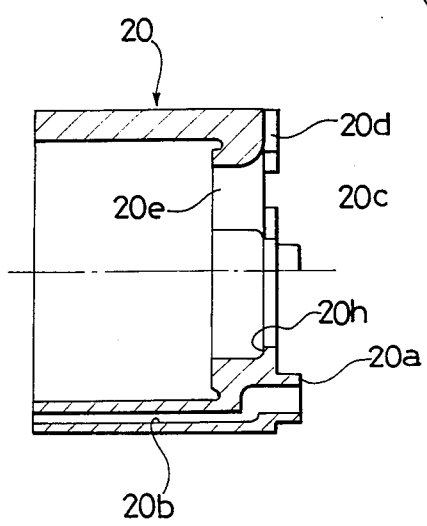
Figure 3C:
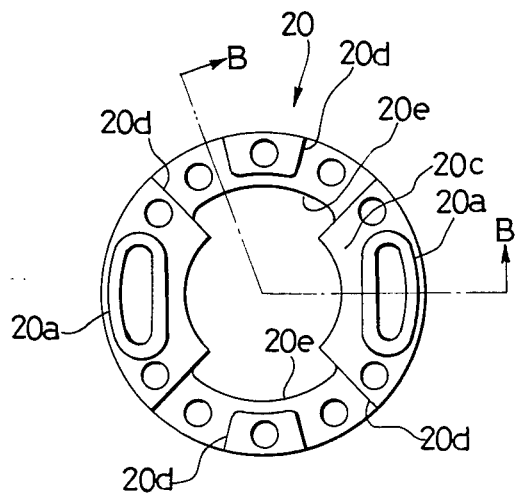

Referring to FIGS. 3(A), (B) and (C), the center body 20 is formed with a pair of elliptical projections 20a which can be fitted into the elliptical openings 18g. These projections 20a are formed with openings which communicates with passages 20b axially extending through the cylindrical wall of the center body 20, thus providing a communication between the axial ends of the center body 20. In a region of the elliptical projections 20a, a pair or wider portions 20c which extend radially inward are disposed in surrounding relationship with the projections, and radially extending grooves 20d which provide a communication between the inside and the outside of the cylindrical center body 20 as well as a pair of axially extending passages 20e are formed between the pair of wider portions 20c or at locations which are offset 90° from the projections 20 a. As shown in FIGS. 3(A) and (C), the axial passages 20e are notched into a sector configuration.

Figure 4A:
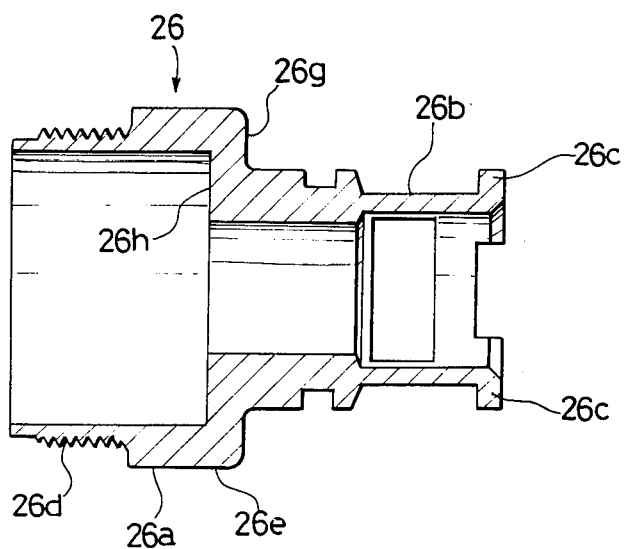
FIG. 4 shows a hub, specifically, FIG. 4(A) being a longitudinal section and FIG. 4(B) a rear view of the hub.
Figure 4B:
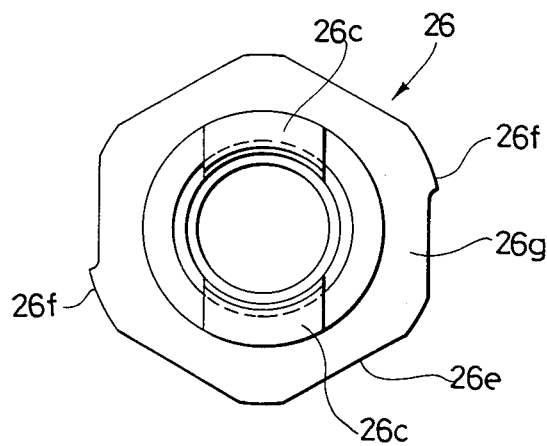

Referring to FIGS. 4(A) and (B), the hub 26 which extends through the valve body 18 and the center body 20 includes a substantially hexagonal portion 26e which is located nearer the portion 26b of a reduced diameter than the threads 26d on the portion 26a of an increased diameter, and a pair of ears 26f are formed on two sides of the hexagonal configuration of the portion 26e which are located symmetrically to each other with respect to the axis.

Figure 5A:
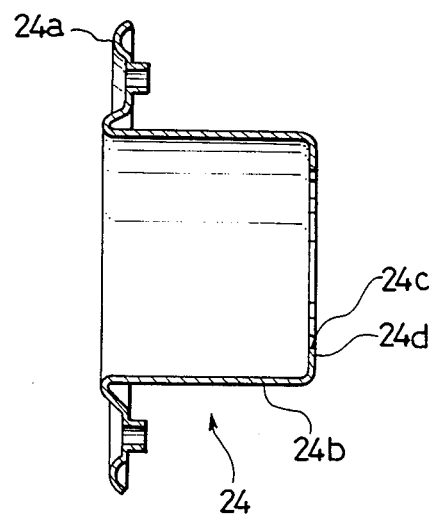
FIG. 5 shows a retainer for the front power piston, specifically, FIG. 5(A) being a longitudinal section and FIG. 5(B) a rear view of the retainer.
Figure 5B:
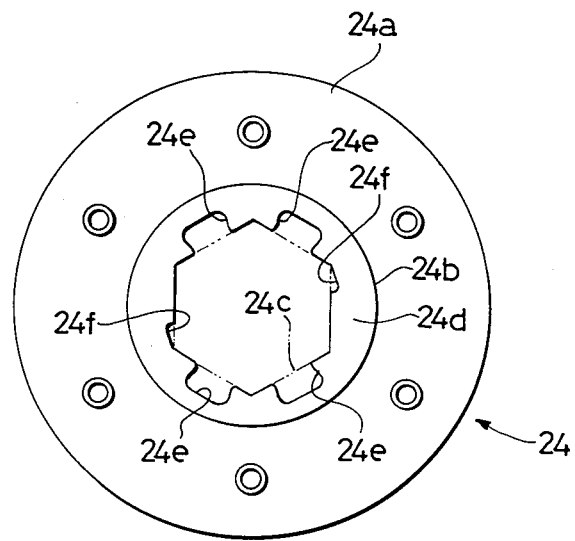

FIGS. 5(A) and (B) show the retainer 24 for the front power piston 8, including a cylindrical portion 24b of an outer diameter which is substantially equal to the internal diameter of the center body 20. The retainer has a bottom 24d in which an essentially hexagonal opening 24c (see phantom line shown in FIG. 5(A)) is formed. Notched paths 24e are formed in two adjacent sides as well as in other two sides which are located symmetrically with respect to the first mentioned sides of the opening 24c, and recesses 24f are formed in the two remaining sides of the opening at symmetrical positions for receiving the ears 26f on the hub 26. When the cylindrical portion 24b of the retainer 24 is fitted inside the center body 20 and is assembled in proper position, two adjacent notched paths 24e communicate with one of the sector-shaped axial passages 20e formed in the center body 20.

Figure 6A:
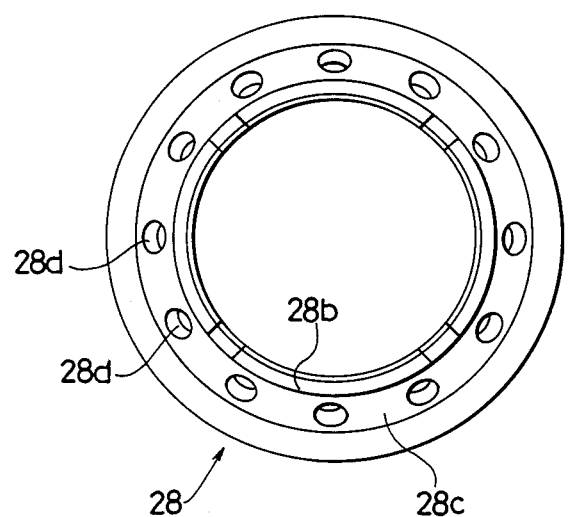
FIG. 6 shows a nut, specifically, FIG. 6(A) being a front view and FIG. 6(B) being a longitudinal section of the nut.
Figure 6B:
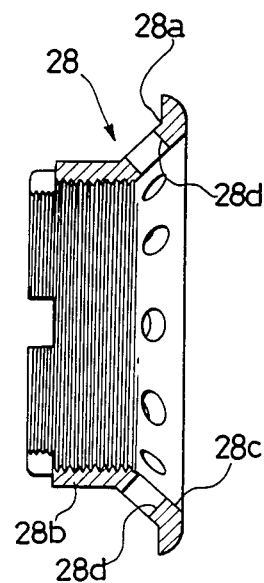

FIGS. 6(A) and (B) show the nut 28 which is threadably engaged with the male threads 26d on the hub 26. The nut 28 comprises a cylindrical portion 26b on which the male threads are formed, and a tapered portion 28c having a gradually increasing diameter, with a number of communicating holes 28d formed in the tapered portion 28c.

FIGS. 7(A) and (B) show the rear power piston 10 including a pair of openings 10a which permits the elliptical projections 20a on the center body to extend therethrough, and a pair of passages 10b which can communicate with sector-shaped passages 20e.

In assembly, the rear power piston 10 and the rear diaphragm 16 which is carried thereon are disposed so as to be held sandwiched between the valve body 18 and the center body 20, and the elliptical projections 20a on the center body 20 are fitted into the openings 10a formed in the rear power piston 10 to extend therethrough into the elliptical openings 18g formed in the valve body 18. As a result, the passage 18d which extends from the increased diameter portion 18b into the cylindrical portion 18a of the valve body 18 communicates with the radially extending grooves 20d and the sector-shaped axial passages 20e formed in the center body 20 through the passage 10b formed in the rear power piston 10. The reduced diameter portion 26b of the hub 26 is then inserted into the center body 20 and the arcuate projections 26c on the hub 26 are moved into alignment with the notches 18h formed in the valve body 18, thus inserting the hub into the valve body 18. The hub 26 is then rotated through 90° so that the arcuate projections 26c are fitted into the recesses 18i formed in the valve body 18, thus locking the hub 26 against withdrawal from the valve body 18 and the center body 20. The retainer 24 for the front power piston 8 is then inserted into the center body 20 so that the hexagonal opening 24c formed in the bottom 24d thereof is fitted around the hexagonal portion 26e in the increased diameter portion 26a of the hub 26. It will be seen that since the hexagonal portion 26e of the hub 26 is formed with the pair of ears 26f while the opening 24c in the retainer 24 is formed with the pair of recesses 24e, the retainer cannot be fitted around the hub unless the ears 26f and the recesses 24e are aligned with each other. Thus it is assured that the ears 26f can be fitted into the recesses 24e only at a pair of relative positions thereof which are displaced 180° from each other, whereupon the notched paths 24e in the retainer 24 are each in communication with the sector-shaped axial passages 20e formed in the center body 20. Subsequently, the nut 28 is threadably engaged with the threads 26d on the hub 26, thus integrally connecting the described members together.

When the brake booster is assembled in the manner mentioned above, the pressure chambers A and C are normally in communication with each other through the radially extending grooves 20d and the sector-shaped paths 20e both formed in the center body 20, the notched paths 24e in the retainer 24 and the communication holes 28d formed in the nuts 28 while the pressure chambers B and D are normally in communication with each other through the passages 20b extending through the cylindrical wall of the center body 20, the openings within the elliptical projections 20a and the elliptical passages 18j formed in the elliptical openings 18g of the increased diameter portion 18b of the valve body 18. In addition, the pressure chamber C communicates with the passage 18d which extends from the increased diameter portion 18b into the cylindrical portion 18a of the valve body 18 while the pressure chamber D communicates with the radial passages 18e formed in the valve body 18. A valve mechanism 42 including the described valve plunger 32 controls a communication among the passages 18d and 18e and the atmosphere.

In the described embodiment, the hub 26 and the retainer 24 have their portions which are adapted for mating engagement shaped to be hexagonal, but the hexagonal configuration of these parts are not essential. Instead of providing the ears 26f on the hub 26, the hub 26 may be formed with recesses while the retainer 24 may be formed with ears.

While the invention has been described above in connection with the preferred embodiment thereof, it should be understood that a number of changes, modifications and substitutions will readily occur to one skilled in the art from the above disclosure without departing from the scope and spirit of the invention as defined by the appended claims.

What is claimed is:

1. A brake booster of tandem type including a valve body internally housing a valve mechanism which controls a communication between pressure chambers defined within a shell and a communication between the pressure chambers and the atmosphere, the valve body including passages which provide a communication between the pressure chambers, a center body connected to the valve body and formed with a passage which is adapted to be connected to one of said passages in the valve body, a combination of front and rear power pistons which define the pressure chambers within the shell and centrally formed with paths which are connected to the passages in the valve body and center body, and a hub which is disposed in alignment with the axes of the valve body, the center body and the front power piston and extending through openings therethrough, a nut, said hub being adapted to be threadably engaged with said nut to axially sandwich the valve body, the center body and the front power piston together in an integral manner, the front power piston including a cylindrical retainer portion which is fitted inside the center body and having a radially inward extending, annular flange; wherein said nut has a portion threadedly engaging externally threads on a portion of said hub protruding forward through said annular flange of said front piston, said nut having an intermediate portion extending radially outward from said threaded portion, and said nut having a radially outer peripheral portions backing the portion of said front piston flange immediately adjacent said cylindrical retainer portion of said front piston, said radially outer peripheral portion being carried by said intermediate portion said intermediate portion of said nut sloping conically rearward toward the radially outer part of said front piston flange, said nut being axially spaced from the radially inner part of said flange.

2. The apparatus of claim 1 in which said path of said front piston includes a hole in said flange, said passage of said center body axially communicating through said hole in said flange with a said pressure chamber located in front of the front piston, said nut intermediate portion having at least one through hole communicating from the last-mentioned said chamber to an annular space axially between said nut and front portion flange, said hole in said flange communicating with said annular space, so as to establish fluid communication from said last-mentioned chamber through said hole in said nut with said center body passage, spring means urging said front piston rearward by bearing rearward on said radially outer part of said nut, said nut radially outer portion being concave forwardly to receive said spring means.

3. The apparatus of claim 1 including at least one ear protruding radially out from the outer peripheral surface of the hub and at least one complimentary shaped recess in the inner periphery of said opening in the front power piston for receiving the ear, and thus locking the hub and the front power piston against relative rotation.

4. The apparatus of claim 3 in which the outer peripheral surface of the hub is polygonal while the opening in the front power piston is also polygonal for fitting engagement with the outer peripheral surface of the hub.

5. The apparatus of claim 4 in which both the outer peripheral surface of the hub and the opening in the front power piston are hexagonal.

6. The apparatus of claim 5 in which the hub and the front power piston are provided with a pair of said ears and recesses respectively, at symmetrical locations.

7. The apparatus of claim 1 including means preventing rotation of said valve body with respect to said hub during tightening of said nut threadedly on said hub, said means including an arcuate projection fixedly and integrally formed on one end of the hub and nonrotatably engaged in a recess formed in the internal surface of the valve body, the valve body and the center body and the front and the rear power piston being integrally connected together between the arcuate projection and said nut, which nut is threadably engaged with the other end of the hub.

8. The apparatus of claim 7 in which two of the arcuate projections on the hub and two of the recesses in the internal surface of the valve body are disposed at locations which are symmetrical with respect to their respective axes.

9. A brake booster of tandem type including a valve body internally housing a valve mechanism which controls communication between pressure chambers defined within a shell and communication between the pressure chambers and the atmosphere, the valve body including passages which provide communication between the pressure chambers, a center body connected to the valve body and formed with a passage which is adapted to be connected to one of the passages in the valve body, a combination of front and rear power pistons which define the pressure chambers within the shell, said pistons being centrally provided with paths which are connected to the passages in the valve body and center body, and a hub which extends axially through openings in the valve body, the center body and the front power piston, a nut threadedly engaging said hub to axially sandwich the valve body, the center body and the front power piston together in an integral manner;

means for preventing rotation of said valve body with respect to said hub upon tightening of said nut, said means comprising an arcuate projection fixedly and integrally formed on one end of the hub and nonrotatably engaged in a recess formed in the internal surface of the valve body, the valve body and the center body and the front and the rear power piston being integrally connected together between the arcuate projection and said nut, which nut is threadably engaged with the other end of the hub;

means fixing the front power piston nonrotatably on the hub;

means defining a nested projection and recess connection eccentrically located on said valve body and center body with the projection extending through an opening in the rear power piston for preventing relative rotation of the valve body, rear piston and center body;

whereby misalignment of said passages and paths is avoided.

10. The apparatus of claim 9 in which said means fixing the front power piston nonrotatably on the hub include at least one ear protruding radially out from the outer peripheral surface of the hub and at least one complimentary shaped recess in the inner periphery of said opening in the front power piston for receiving the ear, and thus locking the hub and the front power piston against relative rotation.

* * * * *

UNITED STATES PATENT AND TRADEMARK OFFICE
CERTIFICATE OF CORRECTION

PATENT NO. : 4 718 328
DATED : January 12, 1988
INVENTOR(S) : Kohei MORI et al.

It is certified that error appears in the above-identified patent and that said Letters Patent is hereby corrected as shown below:

Column 5, line 64; after "portion" (first occurrence) insert ---,---.

Signed and Sealed this

Twenty-sixth Day of July, 1988

Attest:

DONALD J. QUIGG

*Attesting Officer*     *Commissioner of Patents and Trademarks*